United States Patent [19]

Abou Chakra et al.

[11] Patent Number: 4,554,113
[45] Date of Patent: Nov. 19, 1985

[54] LINEAR POLYCHLOROPHOSPHAZENES POSSESSING A DICHLOROTHIOPHOSPHORYL TERMINAL GROUP, PROCESS FOR PREPARATION OF SAID COMPOUNDS AND UTILIZATION THEREOF

[75] Inventors: Taher Abou Chakra, Villeneuve D'Ascq; Roger De Jaeger, Chereng, both of France

[73] Assignee: Societe Nationale Elf Aquitaine, Courbevoie, France

[21] Appl. No.: 628,403

[22] Filed: Jul. 6, 1984

[30] Foreign Application Priority Data

Jul. 6, 1983 [FR] France .............................. 83 11264

[51] Int. Cl.$^4$ ............................................ C01B 25/10
[52] U.S. Cl. ................................ 260/927 N; 423/300; 568/12
[58] Field of Search ................... 423/300; 260/927 N; 568/12

[56] References Cited

U.S. PATENT DOCUMENTS 3,193,343  7/1965  Becke .................................. 423/300
3,348,927  10/1967  Becke .................................. 423/300

FOREIGN PATENT DOCUMENTS 2234373  3/1974  Fed. Rep. of Germany ...... 423/300

OTHER PUBLICATIONS

Chemical Abstracts Citation 98:64450c.

*Primary Examiner*—John Doll
*Assistant Examiner*—Wayne A. Langel
*Attorney, Agent, or Firm*—Burgess, Ryan & Wayne

[57] ABSTRACT

Linear polychlorophosphazenes having a dichlorothiophosphoryl terminal group and corresponding to the formula $$Cl_2(S)P-NPCl_2]_n Cl$$

wherein n is a number equal to or more than 4.

The aforesaid linear polychlorophosphazenes are prepared by polycondensing $P_2NSCl_5$ by heating under conditions adequate for liberating $PSCl_3$.

These polymers can be applied to all the uses of the classical polychlorophosphazenes.

28 Claims, No Drawings

LINEAR POLYCHLOROPHOSPHAZENES POSSESSING A DICHLOROTHIOPHOSPHORYL TERMINAL GROUP, PROCESS FOR PREPARATION OF SAID COMPOUNDS AND UTILIZATION THEREOF

The invention concerns linear polychlorophosphazenes and more particularly, linear polychlorophosphazenes having a terminal dichlorothiophosphoryl group. The invention also concerns a process for the preparation of said polychlorophosphazenes and the use thereof.

BACKGROUND OF THE INVENTION

Numerous works take into account the preparation of cyclic polychlorophosphazenes, which is relatively easy to carry out owing to the tendency to cyclize of the inferior compounds of the chlorophosphazene series. Linear polychlorophosphazenes, however, have a clearly greater economic interest than cyclic polychlorophosphazenes due to their very extensive possibilities of use as materials having applications of the type of those of silicones, of plastic materials and of natural or synthetic elastomers, as flameproof and incombustible materials or additives that impart flameproof and incombustible properties to the materials and substances to which they are added, as coatings, especially tight coatings, as materials utilizable in the biomedical field, as fertilizers, or even lubricants. Besides, certain elastomers obtained by different substitutions on linear polychlorophosphazenes have been found to have an excellent behavior at low temperatures, the same as with respect to corrosive reagents. The main application of the polychlorophosphazenes is their use as starting materials for obtaining polyorganophosphazenes, which are polymers of remarkable properties.

A few processes for the preparation of linear polychlorophosphazenes have been proposed in the prior art. Specifically, L. G. Lund, N. L. Paddock, J. E. Proctor and H. J. Searle (J. Chem. Soc. London, 1960, p. 2542) have described the preparation of polychlorophosphazenes in accordance with the following reaction diagram:

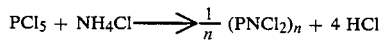

by working in a solvent consisting of symmetrical tetrachloroethane. However, this diagram implies a large number of reaction stages, the yield of which is rarely quantitative, and the mode of operation is lengthy and difficult inasmuch as the net product in which it results is a mixture of cyclic compounds present at a rate of 90% and of linear compounds of the type $PCl_5(PNCl_2)_n$ wherein n does not esceed 20 in a 10% proportion.

To obtain longer linear polymers, the cyclic compounds are then treated with solvents for separating the trimer and the tetramer from which there is extracted, by means of adequate solvents, the pure $(NPCl_2)_3$ that is subjected to a thermal polymerization under reduced pressure, at a temperature of 250° C., for two days, to yield a linear polymer $(PNCl_2)_n$ with an optimal conversion rate of 70% (H. R. Allcock, R. L. Kugel, K. J. Valan-Inorg. Chem. 1966, 5, p. 1709).

Such an indirect method of synthesis requires a substantial number of operations that are rarely quantitative and requires the use of considerable amounts of expensive solvents, which renders prohibitive the cost of production and weighs heavily on the price of the polychlorophosphazenes obtained. In addition, this method only allows the preparation of polychlorophosphazenes of very long chain length on the order of about 15,000 $(NPCl_2)$ patterns and it cannot be controlled to allow the obtention of polychlorophosphazenes where the chain length can be determined at will and especially of linear polychlorophosphazenes of a short or medium chain that is, including, for instance, from 4 to 1000 or more patterns.

In French Pat. No. 79 24037 (publication No. 2,466,435) of Sept. 27, 1979, there was proposed a process for the direct preparation of linear polychlorophosphazenes of short or medium chain length controlled by heating the compound p-trichloro-N-dicholorophosphoryl monophosphazene (rough formula $P_2NOCl_5$), the polychlorophosphazenes obtained having a dichlorophosphoryl terminal group.

Likewise known is the p-trichloro N-dichlorothiophosphoryl monophosphazene (rough formula $P_2NSCl_5$), the same as the dimer and trimer derived therefrom, the latter being obtained by indirect methods of synthesis. M. Becke-Goehring and W. Lehr (Z. Anorg. Allgem. Chem. 1963, 325, pp. 287 to 301) have thus prepared the dichlorothiophosphorylpentachlorodiphosphazene $Cl_2(S)P-N=PCl_2-_2Cl$ by reacting $H_2S$ on the ionic compound $(Cl_3=N-PCl_2=NPCl_3)+PCl_6-$ obtained by the reaction of $PCl_5$ with $NH_4Cl$ in a solvent of a weak dielectric constant; but these authors have not been able to obtain superior homologues wherein the number of recurring $-N=PCl_2-$ units is more than 2 due to the formation of cyclic polychlorophosphazenes by pursuit of the reaction of the ionic compound with $NH_4Cl$. H. W. Roesky (Chem. Ber. 1972, 105 (4) pp. 1439 to 1445) has likewise proposed to synthesize the first members of the series of linear thiophosphorylchlorophosphazenes by gradually lengthening the P=N—P chain by successively causing to react the thiophosphorylchlorophosphazenes of short chain with the hexamethyl disilazane and $PCl_5$. But he has been unable to go beyond the triphosphazene of formula $Cl_2(S)P-N=PCl_2-_3Cl$.

The dichlorothiophosphoryl polychlorophosphazenes obtained by either of the above two indirect methods of synthesis can hardly be industrially applied because of their very low molecular weights. Besides, said methods of synthesis do not allow the preparation of products of higher molecular masses.

BRIEF SUMMARY OF THE INVENTION

The object of the invention is the preparation of linear dichlorothiophosphoryl polychlorophosphazenes having chain length that include a number of recurring units $-NPCl_2-$ greater than 3 and susceptible of being controlled at will to allow the obtention of chains of all the lengths desired according to the applications contemplated, said polychlorophosphazenes being directly prepared from the compound $P_2NSCl_5$ by a synthesis process which is easy to carry out.

The linear dichlorothiophosphoryl polychlorophosphazenes according to the invention correspond to the following formula (I):

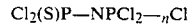  (I)

wherein n is a number equal or greater than 4, it being possible to control at will the value of n for obtaining chains of all medium lengths desired.

Thus, n can assume values going from 4 to about 1000, for instance, or even to higher values such as about 5000 or more.

The dichlorothiophosphoryl polychlorophosphazenes of formula (I) have number average molecular weights (Mn) that are more than about 630 and can have all the values desired reaching, for example, about 120,000 and even about 600,000 or more.

The possibility of controlling at will the value of n, that is, the length of the polymer and consequently the number average molecular weight of the latter, makes it possible to impart certain desired physical properties to the polymers finally obtained and to cause these properties to change within an extensive range.

DETAILED DESCRIPTION OF THE INVENTION

According to the invention the polychlorophosphazenes corresponding to formula (I) are obtained by polycondensing $P_2NCl_5$ by heating under the pressure and temperature conditions adequate for liberating $PSCl_3$ with control of the quantity of liberated $PSCl_3$ so as to obtain the desired degree of condensation at least equal to 4, that is to say, the required number average molecular weight greater than about 630, for the dichlorothiophosphoryl polychlorophosphazene formed.

Without being bound by this hypothesis, it is thought that the polycondensation of $P_2NCl_5$, the developed formula of which can be written as

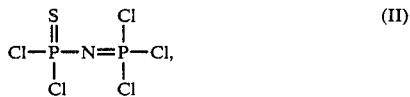
(II)

is carried out according to the following reaction diagram:

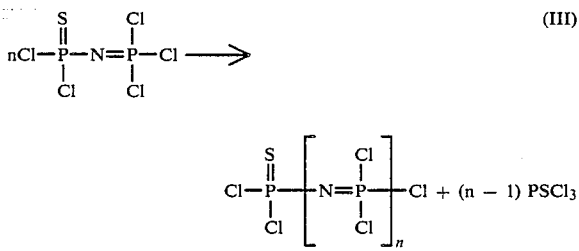

Formula (III) is supposed to be the developed formula of the dichlorothiophosphoryl polychlorophosphazenes having the rough formula (I).

The polychlorophosphazenes according to the invention, obtained by polycondensation by heating $P_2NCl_5$, are free of cyclic phosphazenes and in addition no longer contain sulfurated impurities, especially elementary sulfur.

In the process of production of polychlorophosphazenes by heating $P_2NCl_5$ described in French Pat. No. 79 24037, no degradation of the reaction products is to be feared. It is known, on the contrary, that sulfur organic compounds such as $PSCl_3$ are compounds that yield sulfur, and it could be expected that the heating of $P_2NCl_5$ under the conditions of a polycondensation that releases $PSCl_3$ lead to the obtention of a polymer polluted by a more or less considerable amount of sulfurated impurities and especially elementary sulfur, which makes it inadequate for use. The obtention by heating $P_2NCl_5$ of a polymer free from any sulfurated impurity, in particular elementary sulfur, has therefore an unexpected nature.

The molar amount of $PSCl_3$ released during the polycondensation by heating $P_2NCl_5$ advantageously represents at least about 75%, and preferably, at least about 90% of the molar amount of $P_2NCl_5$ subjected to polycondensation.

The polycondensation of $P_2NCl_5$ is most often carried out under atmospheric or reduced pressure that is, under pressures going from about 10 Pa to $10^5$ Pa, but in certain cases, it can be considered working under pressures above atmospheric pressure and especially under pressures on the order of about $10^6$ Pa or more. When the polycondensation is carried out under reduced pressure, it is possible to work between about 10 Pa and $35 \times 10^3$ Pa and preferably between about 50 Pa and $20 \times 10^3$ Pa.

In the course of the polycondensation, the pressure may vary and it is possible to carry out said polycondensation partly under atmospheric and partly under reduced pressure. The polycondensation can start, for instance, under atmospheric pressure and continue under reduced pressure ranging especially from about 10 Pa to $35 \times 10^3$ Pa and more particularly, from about 50 Pa to $20 \times 10^3$ Pa.

When the polycondensation starts at atmospheric pressure and continues under reduced pressure, the duration of the polycondensation at atmospheric pressure represents from about 70 to 90% of the total duration of the polycondensation, while the duration of the polycondensation under reduced pressures represents about 30 to 10% of said total duration.

The polycondensation temperatures may vary quite substantially according to the pressures used. When working at atmospheric pressure or under pressures approximating the latter, temperatures of at least about 150° C. are needed, while under reduced pressure, the polycondensation can be started at temperatures as low as about 90° C. if the working pressure is low enough such as in the order of from about 10 Pa to 100 Pa., even though in this case it would be preferable to work at temperatures of at least about 120° C. for obtaining an important degree of condensation. In practice, there are used temperatures of at least about 120° C. and more especially going from about 140° C. to 350° C. when the polycondensation is carried out under reduced pressures going from about 10 Pa to about $35 \times 10^3$ Pa and more particularly from about 50 Pa to about $20 \times 10^3$ Pa, while under pressures equal or approximate to atmospheric pressure, temperatures of at least about 150° C. and more particularly going from about 160° C. to 350° C. are appropriate. Whatever the polycondensation pressure comprised within the range of from about 10 Pa to about $10^5$ Pa, it is possible advantageously to operate at temperatures of at least about 150° C., quite particularly from about 160° C. to 350° C. and more specifically from about 170° C. to 300° C.

When the polycondensation is carried out partly under atmospheric pressure and partly under reduced pressure, and especially starting under atmospheric pressure and then continuing under reduced pressure as indicated above, the phase of polycondensation at atmospheric pressure is carried out at temperatures of at least about 150° C. and more particularly going from about 160° C. to 350° C. while the polycondensation phase at reduced pressure is carried out at temperatures of at least about 120° C. and more specifically from about 140° C. to 350° C. Both polycondensation phases can be advantageously carried out at temperatures of at least about 150° C., quite particularly going from about 160° C. to 350° C. and more specifically from about 170° C. to 300° C.

In the course of the polycondensation, the temperature of the reaction medium can be maintained substantially constant or on the contrary, vary according to a predetermined law. Polycondensation, for instance, can be started at a temperature going from about 240° C. to 350° C. for a period going from about 10 to 30% of the total duration of the polycondensation; the temperature of the reaction medium is then gradually lowered to a value going from about 150° C. to 235° C. and then maintained at said value until the end of the polycondensation.

The duration of the polycondensation depends, among other factors, on the temperature at which the polycondensation is carried out, said duration being shorter as the temperature is higher. Durations of polycondensation of from about 1 hour to about 40 hours generally make it possible to obtain the result sought.

The polycondensation controlled according to the invention can be carried out, at least in part, under an inert gas current such as under a current of anhydrous nitrogen, which favors the separation of $PSCl_3$ and because of that reduces the duration of the polycondensation.

It is likewise preferable to carry out the polycondensation while stirring. The polycondensation according to the invention can be carried out until the practically complete elimination of $PSCl_3$ without observing any branching reaction.

The degree of condensation obtained depends not only on the temperatures and pressures used but also on other parameters such as, especially, the period of heating, the volume treated, the stirring conditions and the atmosphere under which the polycondensation develops, it being possible to select said parameters so as to obtain the optimal result being sought.

If needed, the raw product of the polycondensation reaction can be purified by treatment with a solvent of cyclic phosphazenes such as petroleum ether, which is at the same time a solvent of linear polychlorophosphazenes of short chain (oligomers for which n is less than 4).

Since the absorption relative to grouping P=S is sufficiently important in infrared spectroscopy, this technique can be used for following the development of the polycondensation. Besides, since sulfur is a heavy enough element, it is possible to use X-ray fluorescence to determine the degree of medium condensation of the polychlorophosphazene of formula (I) resulting from the polycondensation, said determination being effected starting from the measure of the intensity ratio $$IP_{k\alpha}/IS_{k\alpha}$$

As indicated above, the dichlorothiophosphoryl polychlorophosphazenes according to the invention include less than about 5% cyclic polychlorophosphazenes and linear polyphosphazenes of short chain, which are eliminated by the above mentioned purification treatment and do not contain sulfurated impurities, especially elementary sulfur.

The product that precipitates in the course of the purification treatment has been identified as consisting of high polymers of formula (I) by the following methods:

SPECTROSCOPY IR

The IR spectrum of the polychlorophosphazenes of formula (I) has:
- an intensive and broad absorption at $1300 \text{ cm}^{-1}$ characteristic of the elongation P=N;
- an absorption at $760 \text{ cm}^{-1}$ characteristic of the deformation δ (PNP) in the polymer;
- two absorptions of strong intensity at $590 \text{ cm}^{-1}$ and medium intensity at $540 \text{ cm}^{-1}$ relative to the elongations of the P—Cl bond (these assumptions are made by comparison with the works by MANLEY and WILLIAMS (Polymer, 1969, 10, p. 307) concerning the high polymer $(NPCl_2)_n$).

NMR of 31 P

The RMN spectrum of 31 P has a peak at +16.6 ppm (reference: $H_3PO_4$ at 85%) characteristic of the $NPCl_2$ pattern, which is in conformity with the results of ALLCOCK et al (Inorg. Chem. 1965, 5, p. 1709). The absence of peak at −20 ppm and at +4.7 ppm characteristic of $(NPCl_2)_3$ and of $(NPCl_2)_4$, is likewise observed.

UV SPECTROSCOPY

The UV spectrum, by its absorption in the region of 370 nm, confirms the formation of linear phosphazenes.

CHROMATOGRAPHY ON THIN LAYER

The chromatography on thin layer of the raw product resulting from the polycondensation, carried out according to the instructions of NOVOBILSKY et al (Z. Anorg. Allg. Chem 1975, 416, p. 187 and 1976, 423, p. 273), makes evident the near absence of cyclic phosphazenes.

On the other hand, measurements of vitreous transition temperature effected by differential enthalpic analysis on the polymers according to the invention having chains of different lengths give all values in the vicinity of −60° C., the number of recurring —$NCl_2$— patterns appearing to have only a very slight influence on said temperature.

The dichlorothiophosphoryl polychlorophosphazenes according to the invention can have numerous industrial applications both by themselves, as indicated above, and as starting materials for the preparation of polyorganophosphazenes by using the following substitution reactions:

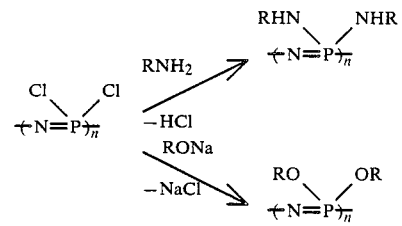

It has thus been possible to obtain the following polymers: $[NP(OMe)_2]_n$; $[NP(OCH_2CF_3)_2]_n$; $[NP(OCH_2C_3F_7)_2]_n$; $[NP(OCH_2CF_3)(OCH_2C_3F_7)]_n$ having remarkable properties, in particular for $[(NP(OCH_2CF_3)(OCH_2C_3F_7)]_n$, which is an amorphous elastomer resistant to hydrolysis, to heat and to most solvents and chemical products, and which are used in industry as elastomers, thermoplastic materials, eventually supple, capable of providing films, and as glass-substitute products. The invention also has the advantage of providing a process for preparation of linear polychlorophosphazenes of long chain that is simple, quick, quantitative and not difficult.

The invention is illustrated by the non-limiting examples given below.

EXAMPLE 1

(a) Synthesis of P$_2$NSCl$_5$

This synthesis is carried out by preparing first P$_3$NCl$_{12}$ by reacting PCl$_5$ on NH$_4$Cl in POCl$_3$, as indicated by SEGLIN et al. (U.S. Pat. No. 3,231,327), then reacting the P$_3$NCl$_{12}$ obtained with P$_2$S$_5$ under the conditions of operation described by KHODAK and GILYAROV (Izv. Akad. Nauk SSSR, Ser. Khim., 1949(4), p. 924).

The operation is carried out in a reactor provided with a stirrer with anchor and topped by two coolants protected against the atmospheric humidity by two columns filled with P$_2$O$_5$.

282 g (1.35 mole) PCl$_5$, 29.2 g (0.54 mole) NH$_4$Cl and 180 ml (1.95 mole) POCl$_3$ were introduced in the reactor. The contents of the reactor, under stirring and in an inert atmosphere, were brought to 80° C. and then kept at this temperature for 6 hours. An abundant liberation of HCl was produced during said period. The reaction medium was then allowed to return to room temperature, thereafter adding 78.5 g (0.35 mole) P$_2$S$_5$, and then bringing the whole to a temperature of 80° C. for two hours.

The resulting reaction medium was then filtered and, by evaporation under vacuum of the filtrate, there remained a liquid solidifying at room temperature and atmospheric pressure. By distillation of said liquid at 75°–80° C. under a reduced pressure of about 13 Pa, there were collected 45.75 g of a product exclusively consisting of P$_2$NSCl$_5$, as shown by examination of said product by IR spectroscopy and by RMN of 31 p.

(b) POLYCONDENSATION OF P$_2$NSCl$_5$

The operation was carried out in a reactor equipped with a magnetic stirring system and topped by a VIGREUX column connected to a graded tube by means of a coolant. The whole equipment was protected against atmospheric humidity by columns filled with P$_2$O$_5$.

48.5 g (0.170 mole) P$_2$NSCl$_5$ obtained as described in part (a) of this example was introduced in the reactor. The contents of the reactor, kept under moderate stirring, were brought to a temperature between 220° and 240° C. and then kept at this temperature for 6 hours. In the course of this heating, there was observed a separation of PSCl$_3$, slow at first and then accelerating after the separation of about half the theoretical volume capable of being produced from the quantity of P$_2$NSCl$_5$ used.

At the end of eight hours of heating, the quantity of PSCl$_3$ collected was 28.3 g (0.167 mole), which substantially corresponds to the theoretical quantity of PSCl$_3$ capable of being produced. At the end of said period, heating was still continued under the same conditions for 2 additional hours.

The net product obtained (20 g) was entirely soluble in benzene, which proves the absence of branched polychlorophosphazenes.

The analysis of the product for (NPCl$_2$)$_n$ gave the following results:

|  | Cl | N | P |
| --- | --- | --- | --- |
| theoretical: | 61.21% | 12.07% | 26.72% |
| found: | 61.3% | 11.7% | 26.8% |

The above mentioned net product was treated at 40°–60° C. by petroleum ether, which is a precipitant of high polymers (NPCl$_2$)$_n$ and a solvent of cyclic phosphazenes, the same as of phosphazenes of the Cl$_2$(S)P—NPCl$_2$]$_n$Cl type wherein n is small (2 or 3). There was thus solubilized a fraction representing about 3% by weight of the product treated.

A chromatographic control (chromatography in thin layer on silica plate with hexane as diluent) of the fraction insoluble in petroleum ether showed the absence of residual P$_2$NSCl$_5$ and of cyclic phosphazenes.

The fraction insoluble in petroleum ether containing the purified polymer, was dissolved in anhydrous benzene and treated with CF$_3$CH$_2$Ona to replace the chlorine atoms of the polymer with less reactive CF$_3$CH$_2$O— groupings, which makes it possible to obtain a polymer easier to manipulate and on which molecular masses can be determined. The treatment with CF$_3$CH$_2$ONa was effected under conditions similar to those proposed by H. R. ALLCOCK et al. (Inorg. Chem. 1966,5, p. 1714) for the corresponding treatment of the polydichlorophosphazenes.

The trifluoroethoxylated polymer obtained had a weight average molecular weight (Mw) equal to 440,000, a number average molecular weight (M̄n) of 265,000, and a polydispersity index equal to 1.66. The corresponding polymer resulting from the polycondensation of P$_2$NSCl$_5$ had a number average molecular weight equal to 126,600, which corresponds to a medium value of the number n of recurring —NPCl$_2$— patterns in formula (I) equal to about 1090.

The study by X-ray fluorescence of the polymer resulting from the polycondensation showed that the latter was free of elementary sulfur. The IR spectrum and the NMR spectrum of the 31 P obtained for said polymer were likewise in conformity with a formula of the linear dichlorothiophosphoryl polychlorophosphazene type for the polymer, this formula being expressed in developed form as follows

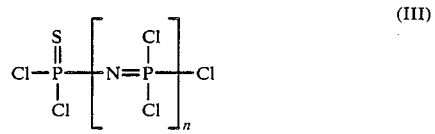

(III)

n having in this example a medium value of about 1090.

EXAMPLE 2

The work was carried out in a reactor equipped as in Example 1.

205 g (0.072 mole) P$_2$NSCl$_5$ prepared as described in part (a) of Example 1 were introduced in the reactor. The contents of the reactor, kept under moderate stirring, were brought to a temperature of about 230° C. and then kept at said temperature for 6 hours.

At the end of this period, the polycondensation was stopped, the quantity of PSCl$_3$ collected being equal to 12.20 g. This quantity is slightly more than the theoretical quantity (12.17 g) of PSCl$_3$ capable of being liberated as result of the distillation of a small quantity of P$_2$NSCl$_5$.

The net product (8.2 g) resulting from the polycondensation was entirely soluble in benzene, which proves the absence of branched polychlorophosphazenes.

The analysis of the product for (NPCl$_2$)$_n$ gave the following results:

|  | Cl | N | P |
|---|---|---|---|
| theoretical: | 61.21% | 12.07% | 26.72% |
| found: | 61.4% | 12.2% | 26.5% |

The net product cited above was treated with petroleum ether at 40°-60° C., thus solubilizing a fraction that represented less than 4% by weight of the treated product.

A chromatographic control (chromatography in thin layer on silica plate with hexane as diluent) of the fraction insoluble in petroleum ether showed the absence of residual P$_2$NSCl$_5$ and of cyclic phosphazenes.

The fraction insoluble in petroleum ether which was formed by the purified polymer, was dissolved in anhydrous benzene and treated with CF$_3$CH$_2$ONa as indicated in Example 1.

The trifluoroethoxylated polymer obtained had a number average molecular weight equal to 25000. The corresponding polymer resulting from the polycondensation of P$_2$NSCl$_5$ had a number average molecular weight equal to 11900, which corresponds to a medium value of the number n in formula (I) equal to 101.

The study by X-ray fluorescence of the polymer resulting from the polycondensation showed that the latter contained no elementary sulfur. The IR spectrum and the NMR spectrum of the 31 P obtained for said polymer were likewise in conformity with a formula of the linear dichlorothiophosphoryl polychlorophosphazene type, as shown in formula (I) or the corresponding developed formula (III) with n having a medium value equal to 101.

EXAMPLE 3

The work was carried out in a reactor equipped as described in Example 1.

48.5 g (0.170 mole) P$_2$NSCl$_5$ prepared as indicated in part (a) of Example 1 were introduced in the reactor. The contents of the reactor, kept under moderate stirring, were brought to a temperature of about 230° C., and then kept at said temperature for 6 hours.

At the end of this period, the polycondensation was stopped, the quantity of PSCl$_3$ collected being equal to 26.3 g.

The net product (22 g) resulting from the polycondensation was entirely soluble in benzene, which proves the absence of branched polychlorophosphazenes.

The analysis of the product for (NPCl$_2$)$_n$ gave the following results:

|  | Cl | N | P |
|---|---|---|---|
| theoretical: | 61.21% | 12.07% | 26.72% |
| found: | 61.2% | 12.3% | 26.6% |

The above mentioned net product was treated with petroleum ether at 40°-60° C., thus solubilizing a fraction that represented less than 5% by weight of the treated product.

A chromatographic control of the fraction insoluble in petroleum ether, carried out as indicated in Example 1, showed the absence of residual P$_2$NSCl$_5$ and of cyclic phosphazenes.

The fraction insoluble in petroleum ether, containing the purified polymer, was dissolved in anhydrous benzene and treated with CF$_3$CH$_2$ONa, as indicated in Example 1.

The trifluoroethoxylated polymer obtained had a number average molecular weight equal to 3300. The corresponding polymer resulting from the polycondensation of P$_2$NSCl$_5$ had a number average molecular weight equal to 1600, which corresponds to a medium value of the number n in formula (I) equal to 12.

The IR spectrum and the NMR spectrum 31 P obtained for the polymer resulting from the polycondensation were in conformity with a formula of the linear dichlorothiophosphoryl polychlorophosphazene type as shown in rough formula (I) or in corresponding developed formula (III) with n having, in this Example, a medium value equal to 12.

In addition said polymer contained no elementary sulfur, as it appeared when the product was studied by X fluorescence.

We claim:

1. Linear polychlorophosphazenes having a dichlorothiophosphoryl terminal group, represented by the formula

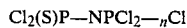

$$Cl_2(S)P-NPCl_2-_nCl$$

wherein n is a number of at least 4.

2. Polychlorophosphazenes according to claim 1, wherein the value of n ranges from 4 to about 5000.

3. A process for the preparation of linear polychlorophosphazenes having a dichlorothiophosphoryl terminal group, which comprises polycondensing P$_2$NSCl$_5$ by heating under pressure and temperature conditions adequate for releasing PSCl$_3$, with control of the amount of PSCl$_3$ released so as to obtain a dichlorothiophosphoryl polychlorophosphazene having a number average molecular weight ($\overline{M}n$) greater than about 630.

4. A process according to claim 3, characterized by controlling the quantity of released PSCl$_3$ so as to obtain a dichlorothiophosphoryl polychlorophosphazene having a number average molecular weight ($\overline{M}n$) of from about 630 to 600,000.

5. A process according to claim 3, wherein the controlled quantity of PSCl$_3$ released by heating P$_2$NSCl$_5$ comprises at least about 75% of the molar quantity of P$_2$NSCl$_5$ subjected to polycondensation.

6. A process according to claim 5, wherein the controlled quantity of PSCl$_3$ released by heating P$_2$NSCl$_5$ comprises at least about 90% of the molar quantity of P$_2$NSCl$_5$ subjected to polycondensation.

7. A process according to claim 3, wherein the polycondensation is carried out at about atmospheric pressure.

8. A process according to claim 3, wherein the polycondensation is carried out at pressures between about 10 Pa and 10$^5$ Pa.

9. A process according to claim 3, wherein the polycondensation is carried out under a reduced pressure between about 10 Pa and 35×10$^3$ Pa.

10. A process according to claim 9, wherein the polycondensation is carried out at a pressure between about 50 Pa and 20×10$^3$ Pa.

11. A process according to claim 3, wherein the polycondensation is carried out partly under about atmospheric pressure and partly under reduced pressure.

12. A process according to claim 3, wherein the polycondensation starts at about atmospheric pressure and continues under a reduced pressure between about 10 Pa and $35 \times 10^3$ Pa.

13. A process according to claim 12, wherein the polycondensation starts at about atmospheric pressure and continues under a reduced pressure between about 50 Pa and $20 \times 10^3$ Pa.

14. a process according to claim 12, wherein the polycondensation under atmospheric pressure is between about 70 and 90% of the total time of polycondensation, while the time of the polycondensation under reduced pressure is between about 30 and 10% of said total time of polycondensation.

15. A process according to claim 7, wherein the temperature of polycondensation is at least about 150° C.

16. A process according to claim 15, wherein the polycondensation temperature is from about 160° to 350° C.

17. A process according to claim 8, wherein the temperature of polycondensation is at least about 150° C.

18. A process according to claim 17, wherein the polycondensation temperature is from about 160° C. to 350° C.

19. A process according to claim 18, wherein the polycondensation temperature is from about 170° C. to 300° C.

20. A process according to claim 9, wherein the temperature of polycondensation is at least about 120° C.

21. A process according to claim 20, wherein the polycondensation temperature is between about 140° C. and 350° C.

22. A process according to claim 11, wherein the phase of polycondensation under atmospheric pressure is carried out at temperatures of at least about 150° C. while the phase of polycondensation under reduced pressure is carried out at temperatures of at least about 120° C.

23. A process according to claim 22, wherein the phase of polycondensation under atmospheric pressure is carried out at temperatures from about 160° C. to 350° C. while the phase of polycondensation under reduced pressure is carried out at temperatures from about 140° C. to 350° C.

24. A process according to claim 3, wherein the polycondensation is started at a temperature of from about 240° C. to 350° C. for a time of from about 10 to 30% of the total time of the polycondensation, the temperature of the reaction medium is then gradually lowered to a value of from about 150° C. to 235° C. and then maintained at this value until the end of the polycondensation.

25. A process according to claim 3, wherein the polycondensation is carried out, at least partly, under an inert gas current.

26. A process according to claim 3 wherein the polycondensation is carried out under stirring.

27. A process according to claim 3, wherein the net product resulting from the polycondensation is purified by treatment with a solvent for cyclic phosphazenes, which is at the same time a solvent for the short chain linear polychlorophosphazenes.

28. A method for preparing polyorganophosphazenes which comprises substituting monovalent organic residues for at least a portion of the chlorine atoms of a dichlorothiophosphoryl polychlorophosphazene of claim 1.

* * * * *